United States Patent
Kang

[19]

[11] Patent Number: 5,848,282
[45] Date of Patent: Dec. 8, 1998

[54] COMPUTER SYSTEM WITH A CONTROL FUNTION OF ROTATION SPEED OF A COOLING FAN FOR A MICROPROCESSOR CHIP THEREIN AND A METHOD OF CONTROLLING THE COOLING FAN

[75] Inventor: Deog-Soo Kang, Suwon, Rep. of Korea

[73] Assignee: SamSung Electronics Co., Ltd., Kyungki-do, Rep. of Korea

[21] Appl. No.: 788,340

[22] Filed: Jan. 27, 1997

[30] Foreign Application Priority Data

Jan. 26, 1996 [KR] Rep. of Korea ..................... 1748/1996

[51] Int. Cl.[6] .................................................. G06F 1/32
[52] U.S. Cl. ................. 395/750.05; 395/750.03; 361/695
[58] Field of Search ........................ 395/750.01, 750.03, 395/750.06, 750.05; 364/557, 707; 361/695, 687, 688

[56] References Cited

U.S. PATENT DOCUMENTS

| | | | |
|---|---|---|---|
| 4,672,228 | 6/1987 | Swoboda | 307/66 |
| 5,396,635 | 3/1995 | Fung | 395/750.05 |
| 5,428,790 | 6/1995 | Harper et al. | 395/750.04 |
| 5,513,361 | 4/1996 | Young | 395/750.03 |
| 5,586,333 | 12/1996 | Choi et al. | 395/750.03 |
| 5,613,906 | 3/1997 | Kikinis | 454/184 |
| 5,631,852 | 5/1997 | Chen | 364/557 |
| 5,687,079 | 11/1997 | Bauer et al. | 364/175 |

*Primary Examiner*—Gopal C. Ray
*Attorney, Agent, or Firm*—Robert E. Bushnell, Esq.

[57] ABSTRACT

A computer system capable of controlling rotation speed of a cooling fan which is used for cooling down heat of a microprocessor chip. The computer system includes a power supply for receiving an AC voltage and generating DC voltages; a power management controller for allowing one of the DC voltage to be provided to the cooling fan in accordance with a power saving mode corresponding to an operation state of the computer system, the power saving mode being one of a normal operation mode, a stand-by mode, a sleep mode and a suspend mode; a power saving mode detector for detecting whether one power saving mode of the computer system is changed to another power saving mode, and generating a first and a second driving signals having different frequencies from each; a delay circuit for delaying the second driving signal for a constant time during the stand-by mode; and a fan driver for supplying a fan driving voltage for the cooling fan in response to the second driving signal to control rotation speed of the cooling fan.

12 Claims, 6 Drawing Sheets

Fig. 3

| POWER MANAGEMENT MODE | MICRO-PROCESSOR | OPERATIONAL FREQUENCY OF MICROPROCESSOR | MONITOR | HDD | POWER MANAGEMENT |
|---|---|---|---|---|---|
| NORMAL | ON | HIGH FREQUENCY | ON | ON | ON |
| STAND-BY | ON | LOW FREQUENCY | OFF | OFF | ON |
| SLEEP | ON | STOP FREQUENCY | OFF | OFF | ON |
| SUSPEND | OFF | OFF | OFF | OFF | ON |
| POWER-OFF | OFF | OFF | OFF | OFF | OFF |

COMPUTER SYSTEM WITH A CONTROL FUNTION OF ROTATION SPEED OF A COOLING FAN FOR A MICROPROCESSOR CHIP THEREIN AND A METHOD OF CONTROLLING THE COOLING FAN

CLAIM OF PRIORITY

This application makes reference to, incorporates the same herein, and claims all benefits accruing under 35 U.S.C. §119 from applications for A Computer System With A Control Function Of Rotation Speed OF A Cooling Fan For A Microprocessor Chip Therein And A Method Of Controlling The Cooling Fan earlier filed in the Korean Industrial Property Office on 26 Jan. 1996, and there duly assigned Serial No. 96/1748.

FIELD OF THE INVENTION

The present invention relates to a computer system capable of controlling rotation speed of a cooling fan which is used for cooling down heat of a microprocessor chip, and more particularly to a portable computer system in which power consumption of a cooling fan for a microprocessor chip therein can be reduced by controlling rotation speed of the cooling fan in accordance with a power saving mode thereof, and a method of controlling the cooling fan.

BACKGROUND OF THE INVENTION

Computer performance has been developed in accordance with the progress of a CPU (central processing unit) embodying a computer system. Data processing speed of a microprocessor chip using as CPU of a computer system is increased with a clock signal of high frequency. A microprocessor chip, which operates with a high frequency so as to improve a data processing speed, generates high heat during operation thereof. In this case, the microprocessor chip may malfunction or destroyed. Thus, such a microprocessor chip is provided with a cooling fan to cool down the chip.

A typical computer, which operates with a high frequency, includes a power supply for receiving an externally applied AC (alternative current) voltage and supplying different DC (direct current) voltages, a power management controller for controlling the supply of the DC voltages to the computer, a memory, a CPU as a microprocessor chip, a cooling fan for cooling down the CPU, an interface for communicating with an external device, and a video control. The computer further includes an input device associated with the interface, a peripheral device and a display associated with the video control.

In the computer system having the above construction, if the CPU starts to operate with a DC voltage from the power supply, it generates a heat. The cooling fan also operates with the DC voltage during operation of the CPU. A heat sink is provided on top of the CPU, and the cooling fan is mounted on the heat sink. Heat generated from the CPU is transmitted to the heat sink and radiated by the cooling fan.

As stated immediately above, since the cooling fan continues to be driven regardless of the power management during the operation of the CPU, a power consumption is large.

On the other hand, the computer system has the power management function so as to reduce power consumption thereof. Power management in a computer is described in, for example, U.S. Pat. No. 5,586,333 to Chun-Geun Choi, et al, entitled, Method And Control Apparatus For General Power Management Signal Of Computer Peripheral Equipment In A Computer System, U.S. Pat. No. 5,428,790 to Leroy D. Harper, et al, entitled, Computer Power Management System, and U.S. Pat. No. 5,396,635 to Henry T. Fung, entitled, Power Conservation Apparatus Having Multiple Power Reduction Levels Dependent Upon The Activity Of the Computer System. Accordingly, a power management function can broadly be classified into five modes of power management, i.e., a normal power operation mode, a stand-by mode, a sleep mode, a suspend mode and a power-off mode.

During a normal operation mode (or full on mode) of the power management, all subsystems, such as an HDD (hard disk drive), a monitor and the like, are fully powered an the microprocessor chip is then operating at full speed. The computer systems remain in this state as long as it detects activity or if the power management controller has been at a disable state.

If the computer system is not used for a constant time, the power management controller is at a stand-by-mode. In this state the microprocessor clip is set to the lowest speed of low frequency possible and the power management controller is put into a reduced power state. The system continually monitors the wake-up activities from subsystems, such as a keyboard, a mouse, a communication port or an application program during this mode. This, in this state the power consumption can be largely reduced.

During a sleep mode of the power management controller, the computer system allows to reduce the speed of the microprocessor chip which receives a DC voltage, but does not receive an operational frequency. At this state, the chip is inactive. And DC voltage is not supplied to most of the subsystems, one exception being the subsystems necessary for returning to a normal operation mode. Therefore the computer system reduces the power consumption.

During a suspend mode, all of the devices including the memory contents are saved to a separate disk portion and the entire computer is turned off, in this state, the contents are saved indefinitely until the computer system is resumed by hitting the power on button. Other than off, this mode is the lowest power state and is fixed to suspend to disk. For example, even a DC voltage is not applied to the microprocessor chip, and a DC voltage is not supplied to the most of the subsystems with the exception of subsystems necessary for restoring them to a normal operation mode.

Finally, in case of a power off mode, the computer system is powered off so that the operation thereof is halted.

As stated above, most of computer systems may perform power management in accordance with operational conditions thereof, and thereby a power consumption therein can be reduced.

However, the cooling fan will continue to operate regardless of the power management function with the exception of the power off mode. The cooling fan receives a DC voltage directly from the power supply and thus it is turned on or off in response to the output voltage of the power supply. Even though the operation speed of the microprocessor chip may have been lowered to a low speed in response to the power saving modes, the cooling fan continues to operate in the same speed as the rotation speed of the fan during the normal operation mode. As a result, there arises a problem that a conventional computer continues to consume an unnecessarily large amount of power. Furthermore, noise is generated during the operation of the fan.

One solution to the foregoing problem is discussed in U.S Pat. No. 5,513,361 to Bruce A. Young, entitled, Method And Apparatus For Reducing Power Consumption Of a Fan In A Computer System, wherein Young contemplates a shutting off the cooling fan when the CPU of the computer system is not operating, i.e., when the CPU is in an inactive stat, whereas the present invention contemplates controlling the rotation speed of the fan depending on the power management mode.

SUMMARY OF THE INVENTION

It is an object of the present invention to provide a computer system which is capable of controlling rotation speed of a cooling fan used for cooling down a microprocessor chip in accordance with a power saving mode thereof.

It is another object of the present invention to provide a computer system which is capable of reducing power consumption of a cooling fan for a microprocessor chip.

According to an aspect of the present invention, a computer system has a microprocessor chip and a cooling fan for cooling down the microprocessor chip. The computer system further comprises a power supply for receiving an AC voltage and generating DC voltages; a power management controller for allowing one of the DC voltages to be provided to the cooling fan in accordance with a power saving mode corresponding to an operation state of the computer system, the power saving mode being one of a normal operation mode, a stand-by-mode, a sleep mode and a suspend mode: a power saving mode detector for detecting whether one power saving mode of the computer system is changed to another power saving mode, and generating first and a second driving signal having different frequencies from each other; a delay circuit for delaying the second driving signal for a constant time during the stand-by-mode; and a fan driver for supplying a fan driving voltage for the cooling fan in response to the second driving signal to control rotation speed of the cooling fan.

According to another aspect of the present invention, a method of controlling a cooling fan for a microprocessor chip which is embodied in a computer system, comprises the steps of determining whether a power saving mode of the computer system is one of a normal operation mode, a stand-by-mode, a sleep mode and a suspend mode; driving the cooling fan at high speed when the power saving mode is the normal operation mode; driving the cooling fan at low speed after elapse of a constant time during the stand-by-mode; and halting the cooling fan after elapse of the constant time during the sleep or the suspend mode.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein:

FIG. 3 is a table showing the operational states of the computer system in accordance with saving modes of power management so as to explain a principle of the present invention;

DETAILED DESCRIPTION OF PREFERRED EMBODIMENTS

Figure 1:
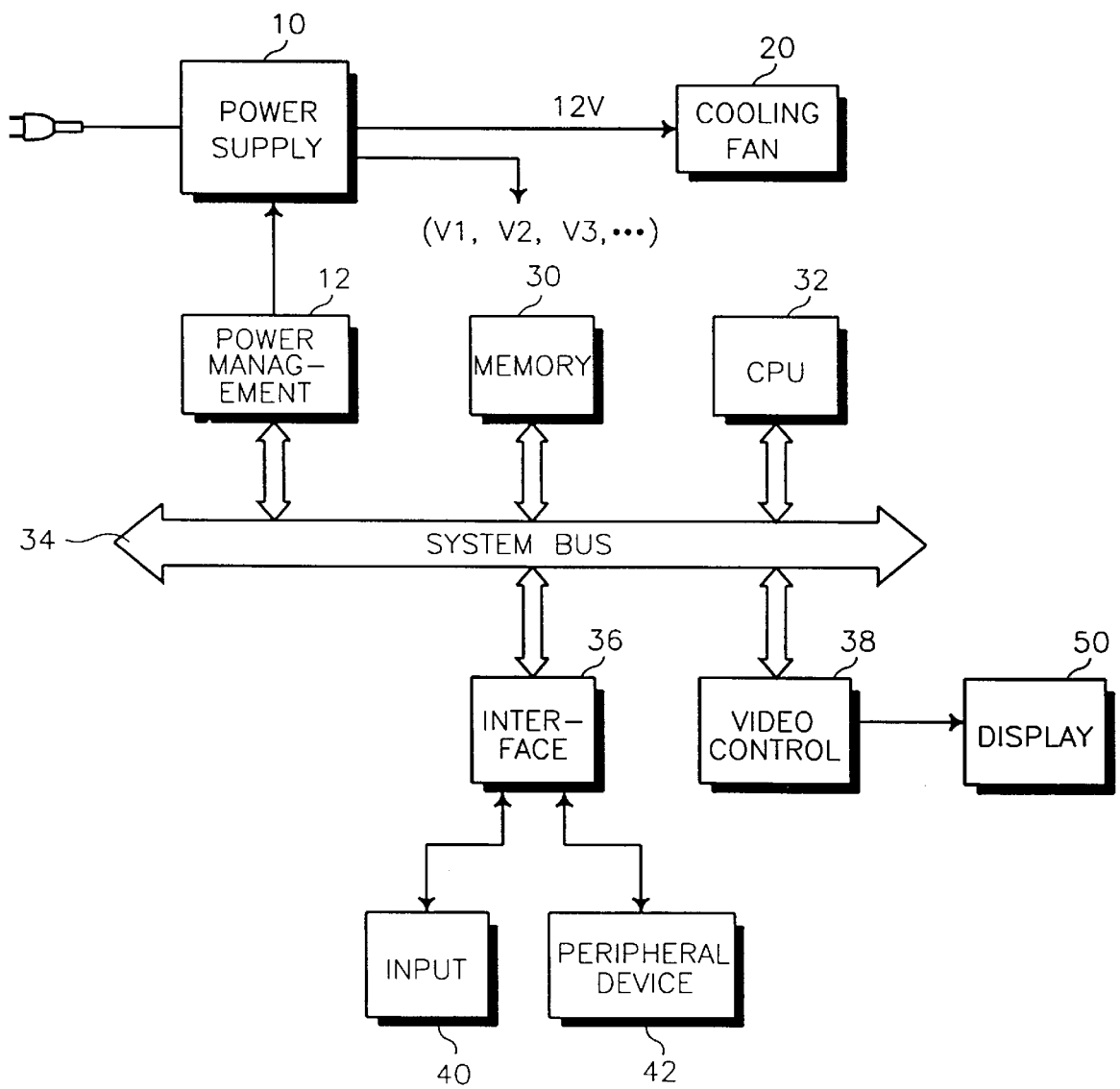
FIG. 1 is a block diagram illustrating an exemplary computer system.

As shown in FIG. 1, a computer, which operates with a high frequency, includes a power supply 10 for receiving an externally applied AC (alternative current) voltage and supplying different DC (direct current) voltages, a power management controller 12 for controlling the supply of DC voltages to the computer, a memory 30, a CPU 32 as a microprocessor chip, a cooling fan 20 for cooling down CPU 32, an interface 36 for communicating with an external device, and a video control 38. The computer further includes an input device 40 associated with interface 36, a peripheral device 42 and a display 50 associated with video control 38.

Figure 2:
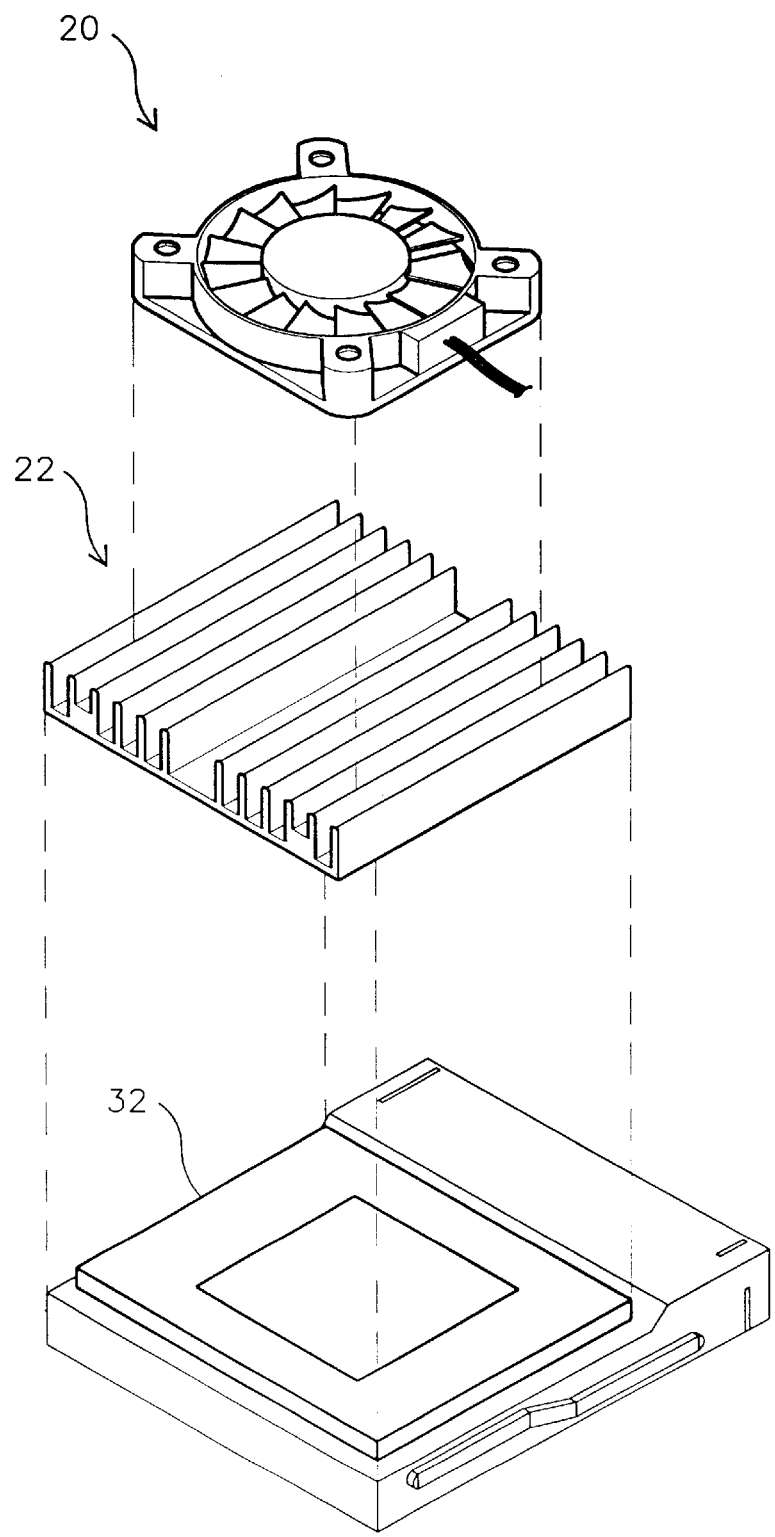
FIG. 2 is a perspective view of the installation of a cooling fan on a microprocessor chip (or CPU) shown in FIG. 1.

In the computer system having the above construction, if CPU 32 starts to operate with a DC voltage from power supply 10, it generates a heat. Cooling fan 20 also operates with the DC voltage during operation of the CPU. The installation of cooling fan 20 on CPU 32 is shown in FIG. 2. In this figure, on the top of CPU 32, a jet sink 22 is provided. Cooling fan 20 is mounted on heat sink 22. A heat generated from the CPU is transmitted to heat sink 22 and radiated by cooling fan 20.

As stated immediately above, since cooling fan 20 continues to be driven regardless of the power management during the operation of CPU 32, a power consumption is large.

On the other hand, the computer system has the power management function so as to reduce power consumption thereof. The power management function is broadly classified into five modes of power management, as shown in FIG. 3. In this figure, during a normal operation mode (or full on mode) of the power management, all subsystems, such as an HDD (hard disk drive), a monitor and the like, are fully powered an the microprocessor chip is then operating at full speed. The computer systems remain in this state as long as it detects activity or if the power management controller has been at a disable state.

If the computer system is not used for a constant time, the power management controller is at a stand-by-mode. In this state the microprocessor chip is set to the lowest speed of low frequency possible and the power management controller is put into a reduced power state. The system continually monitors the wake-up activities from subsystems, such as keyboard, mouse, communication port or application program during this mode. This, in this state the power consumption can be largely reduced.

During a sleep mode of the power management controller, the computer system allows to reduce the speed of the microprocessor chip which receives a DC voltage, but does not receive an operational frequency. At this state, the chip is inactive. And DC voltage is not supplied to the rest subsystems with the exception of subsystems necessary for returning to a normal operation mode. Therefore the computer system reduces the power consumption.

During a suspend mode, all of the devices including the memory contents are saved to a separate disk portion and the entire computer is turned off. In this state, the contents are saved indefinitely until the compute system is resumed by hitting the power on button. Other than off, this mode is the lowest power state and is fixed to suspend to disk. For example, even a DC voltage is not applied to the microprocessor chip, and a DC voltage is not supplied to the rest subsystems with the exception of subsystems necessary for restoring them to a normal operation mode.

Finally, in case of a power off mode, the computer system is powered off so that the operation thereof is halted.

As stated above, most of computer systems may perform power management in accordance with operational conditions thereof, and thereby a power consumption therein can be reduced.

Turning again to FIG. 1, power supply 10 receives AC power externally and provides several levels of voltages to respective subsystems thereof. Power management controller 12 controls the supply/interruption of a DC voltage to the computer system in accordance with the saving mode of power management. Also the microprocessor chip operates at low or high speed in accordance with the saving modes, or does not operate by the interruption of DC voltage thereto.

During only normal operation mode, a high heat is generated from the microprocessor chip which is operating with clock of high frequency. In case of stand-by mode, the chip radiates a relatively low heat because of low speed operation. During sleep mode or suspend mode, a heat is hardly generated from the chip.

However, as shown in FIG. 1, cooling fan 20 operates regardless of the power management. Cooling fan 20 receives a DC voltage directly from power supply 10 and thus it is turned on or off in response to the output voltage of power supply 10. Even though the operation speed of the microprocessor chip is thus lowered to a low speed in response to the saving modes of power management, cooling fan 20 continues to operate in the same speed as the rotation speed of the fan during the normal operation mode. As a result, there arises a problem that a conventional computer is large in power consumption. Furthermore, a noise is generated during the operation of the fan.

Figure 4:
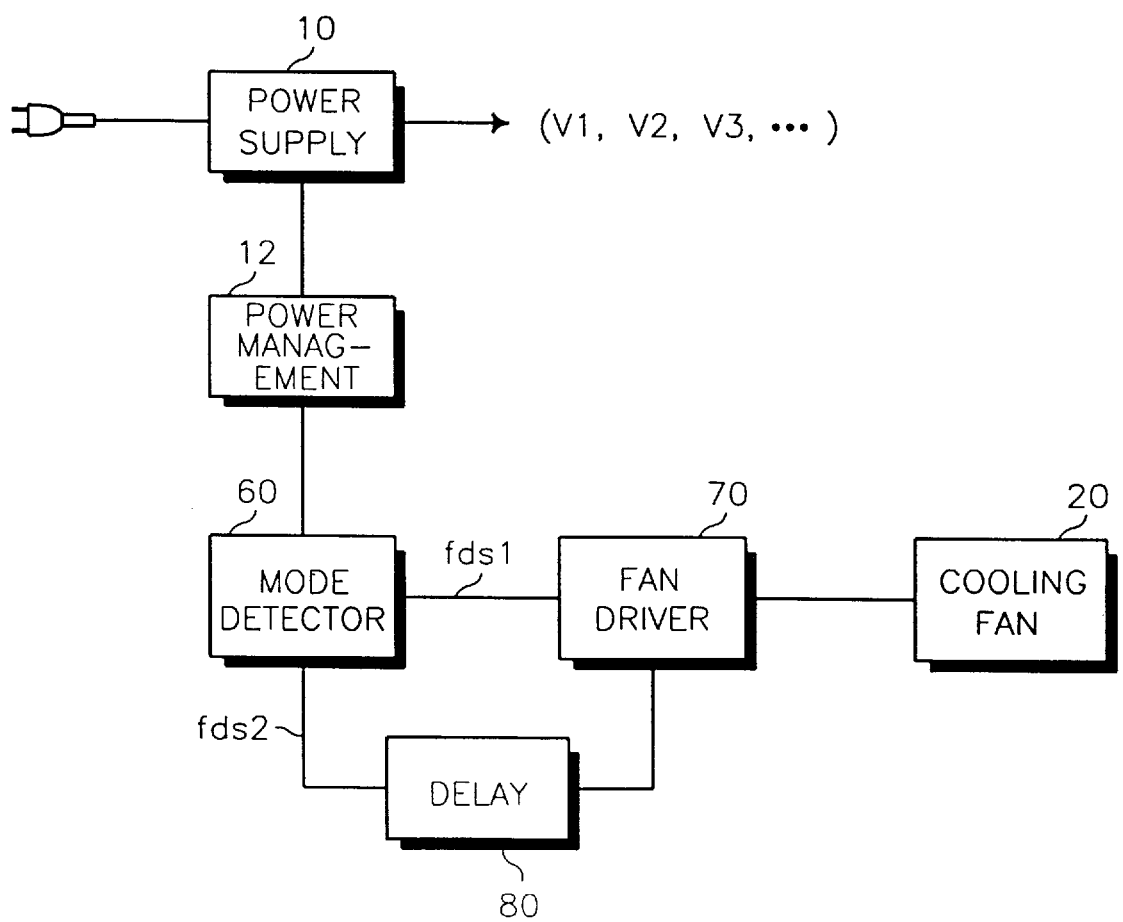
FIG. 4 illustrates, in block diagram form, a control apparatus of a cooling fan for cooling down heat of a microprocessor chip which is embodied in a computer system accordingly to the aspects of the present invention.

Referring to FIG. 4, a novel computer system in accordance with the present invention is illustrated in block diagram form. A power supply 10 and a power management controller 12 are located in the portable computer. Power supply 10 is provided to receive an externally applied AC voltage and supplying different DC voltage of several levels, and power management controller 12 is provided to generate a power saving mode signal in accordance with an operation state of the portable computer.

Referring again to FIG. 4, the computer system further comprises a power saving mode detector 60, a fan driver 70 and a delay circuit 80 so as to drive a cooling fan 20 for the microprocessor chip mounted in the computer in response to a power saving mode of the computer. Mode detector 60 is provided for detecting whether the computer is at a power saving mode and generating a first and a second driving signals fds1 and fds2. Delay circuit 80 delays second driving signal fds2 for a constant preset time and provides a delayed signal fds2' to fan driver 70. Fan driver 70 drives cooling fan 20 in response to the signals. Detector 60 consists of a microcomputer which generates driving signals fds1 and fds2 in accordance with a power saving mode of the computer system. Driving signal fds1 has a high frequency to be used for rotating cooling fan 20 at high speed and driving signal fds2 has a low frequency to be used for rotating cooling fan 20 at low speed.

Figure 5:
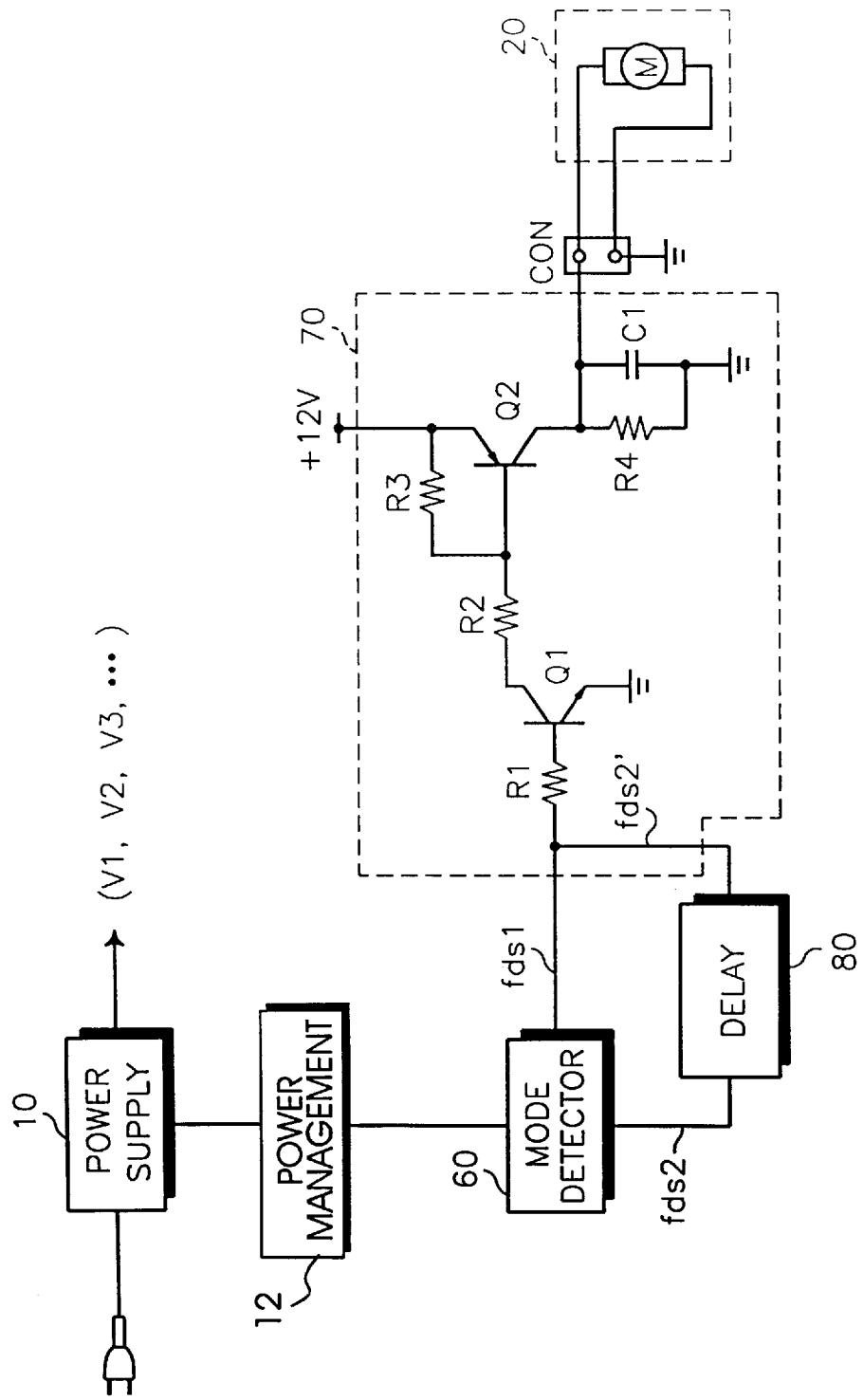
FIG. 5 is a detailed circuit diagram of the control apparatus shown in FIG. 4.

FIG. 5 shows a detailed circuit of fan driver 70. Driving signal fds1 or driving signal fds2' is applied through a load resistor R1 to a base of an NPN transistor Q1. A resistor R2 is provided between the collector of transistor Q1 and a base of a transistor Q2. A resistor R3 is provided between the emitter and base of transistor Q2. The emitter of transistor Q2 is connected to a fan driving voltage source of +12 volts. Between a collector of transistor Q2 and a ground, a resistor R4 and a capacitor C1 are connected in parallel.

The operation of fan driver 70 in response to driving signals fds1 and fds2 will be now described. First, when the computer is in a normal operation mode, driving signal fds1 of high frequency is generated from mode detector 60. Transistor Q1 is turned on thus turning on transistor Q2 in response to driving signal fds1. The 12 volt fan driving voltage is then supplied through a connector CON to cooling fan 20, so that cooling fan 20 is rotated at high speed. Consequently, the microprocessor chip can be rapidly cooled down.

When the computer is in a stand-by mode, diving signal fds2 of low frequency is generated from mode detector 60 and then delayed by delay circuit 80, and delayed signal fds2' is provided to fan driver 70. Transistors Q1 and Q2 of fan driver 70 are subsequently turned on by delayed signal fds2'. The 12 volt fan driving voltage is then supplied through connector CON to cooling fan 20, so that fan 20 is rotated at low speed. Thus the microprocessor chip can be gradually cooled down. As a result, power consumption of cooling fan 20 is reduced.

Also, when the computer is in a sleep mode or a suspend mode, a second driving signal fds2 of low frequency is generated from mode detector 60 and then delayed by delay circuit 80, and delayed signal fds2' is provided to fan driver 70. Cooling fan 20 is then rotated at low speed. Thus, the microprocessor chip can be gradually cooled down. After a predetermined time, however, driving signal fds2 is not generated from mode detector 60 and the fan driving voltage is not applied to the cooling fan. Therefore, cooling fan 20 is halted so that there is no power consumption by cooling fan 20.

Figure 6:
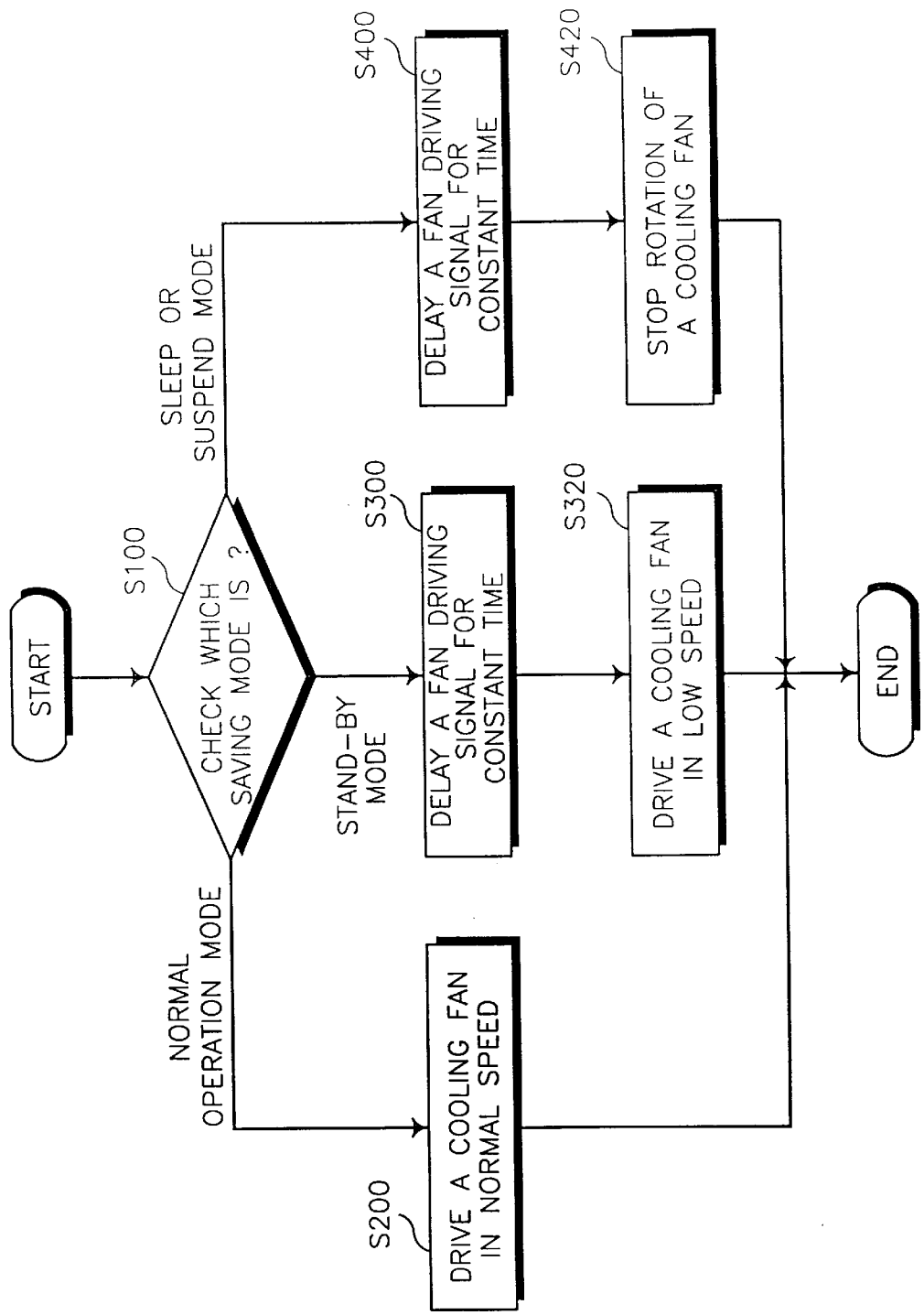
FIG. 6 is a flowchart showing the steps of controlling the cooling fan shown in FIGS. 4 and 5.

FIG. 6 shows the steps of controlling the cooling fan shown in FIG. 5. At step S100, mode detector 60 detects which power saving mode the computer system is utilizing by checking a signal from power management controller 12. If the computer system is in a normal operation mode, the control proceeds to step S200, wherein mode detector 60 generates driving signal fds1 of high frequency for rotating cooling fan 20 at high speed.

When the computer system is in a stand-by mode, the control proceeds to step S300, wherein a driving signal fds2 of low frequency is generated from mode detector 60 and delayed for a constant time by delay circuit 80. During the constant time, driving signal fds2 is not provided to fan driver 70 by means of delay circuit 80 and the control proceeds to step S320. At step S320, after the constant time, delayed signal fds2' is provided to fan driver 70 which drives cooling fan 20 at low speed corresponding to the low operation frequency of the microprocessor chip.

Finally, when the computer system is in a sleep mode or a suspend mode, the control proceeds to step S400, wherein driving signal fds2 is generated from mode detector 60 and delayed for the constant time by delay circuit 80. During the constant time, delayed signal fds2' is provided to fan driver 70, but, after the constant time, delayed signal fds2' is provided to fan driver 70 for a predetermined time and the control proceeds to step S420. At step S420, after the predetermined time, mode detector 60 does not generate driving signal fds2. As a result, cooling fan 20 is halted.

As described above, a computer system of the present invention can control the rotating speed of a cooling fan for a microprocessor chip in accordance with a power saving mode of a computer system. The power consumption of the computer system can be considerably reduced.

Furthermore, because the cooling fan can be rotated at low speed during a stand-by mode of the computer and halted during sleep or a suspend mode thereof, noise due to the high rotation of the cooling fan can be sufficiently reduced.

What is claimed is:

1. An apparatus for controlling a rotating speed of a cooling fan in a computer system, comprising:
   a power management controller for controlling said computer system to operate in one of a normal operation power management mode and a power saving mode;
   means for generating one of a first fan driving signal and a second fan driving signal by detecting one of said normal operation power management mode and said power saving mode; and
   means for controlling said cooling fan to rotate continuously at a first rate in response to said first fan driving signal and to rotate at a second rate slower than said first rate in response to said second fan driving signal.

2. The apparatus as set forth in claim 1, wherein said means for generating one of a first fan driving signal and a second fan driving signal continuously generates said first fan driving signal upon detection of said normal operation power management mode.

3. The apparatus as set forth in claim 1, wherein said means for generating one of a first fan driving signal and a second fan driving signal continuously generates said second fan driving signal upon detection of said power saving mode.

4. The apparatus as set forth in claim 1, wherein said means for generating one of a first fan driving signal and a second fan driving signal generates, upon detection of said power saving mode, said second fan driving signal after a delay time of a predetermined time period.

5. The apparatus as set forth in claim 4, said means for controlling said cooling fan comprising:
   a first transistor having a base connected to a first resistor, a collector connected to a dc voltage source via a second resistor and a third resistor connected in series, and an emitter connected to a ground terminal;
   said first fan driving signal and said third fan driving signal being applied to said base of said first transistor through said first resistor;
   a second transistor having a base connected to a node serially connecting said second resistor to said third resistor, an emitter connected to said dc voltage source, said third resistor being connected between said emitter and said base of said second transistor, and a collector;
   a fourth resistor and a capacitor connected in parallel between said collector of said second transistor and said ground terminal; and
   a connector for connecting said collector of said second transistor to said cooling fan.

6. The apparatus as set forth in claim 1, said means for controlling said cooling fan comprising:
   a first transistor having a base connected to a first resistor, a collector connected to a dc voltage source via a second resistor and a third resistor connected in series, and an emitter connected to a ground terminal;
   a second transistor having a base connected to a node serially connecting said second resistor to said third resistor, an emitter connected to said dc voltage source, said third resistor being connected between said emitter and said base of said second transistor, and a collector;
   a fourth resistor and a capacitor connected in parallel between said collector of said second transistor and said ground terminal;

a connector for connecting said collector of said second transistor to said cooling fan; and
   delay means for outputting a delayed fan driving signal by delaying said second fan driving signal, said first fan driving signal and said delayed fan driving signal being applied to said base of said first transistor through said first resistor.

7. An apparatus for controlling a rotating speed of a cooling fan in a computer system operating in one of a normal operation power management mode and a power saving mode, comprising:
   a power management controller for generating a power management signal indicative of one of said normal operation power management mode and said power saving mode;
   a mode detector for generating one of a first fan driving signal and a second fan driving signal in response to said power management signal; and
   means for controlling said cooling fan to rotate at a first rate in response to said first fan driving signal and to rotate at a second rate slower than said first rate in response to said second fan driving signal.

8. The apparatus as set forth in claim 7, wherein said mode detector continuously generates said first fan driving signal when said power management signal is indicative of said normal operation power management mode.

9. The apparatus as set forth in claim 7, wherein said mode detector continuously generates said second fan driving signal when said power management signal is indicative of said power saving mode.

10. The apparatus as set forth in claim 7, wherein said mode detector generates said second fan driving signal after a delay time of a predetermined time period when said power management signal is indicative of said power saving mode.

11. A method for controlling a rotating speed of a cooling fan in a computer system operating in one of a normal operation power management mode and a power saving mode, comprising the steps of:
   generating a power management signal indicative of one of said normal operation power management mode and said power saving mode;
   generating one of a first fan driving signal and a second fan driving signal in response to said power management signal; and
   controlling said cooling fan to rotate at a first rate in response to said first fan driving signal and to rotate at a second rate slower than said first rate in response to said second fan driving signal.

12. A method for controlling a rotating speed of a cooling fan in a computer system operating in one of a normal operation power management mode and a stand-by power management mode, comprising the steps of:
   detecting which one of said normal operation power management mode and said stand-by power management mode said computer system is operating in;
   generating a first fan driving signal upon detection of said normal operation power management mode;
   generating a second fan driving signal after a time delay of a predetermined time period upon detection of said stand-by power management mode;
   driving said cooling fan at a first rotation speed in response to said first fan driving signal; and
   driving said cooling fan at a second rotation speed slower than said first rotation speed in response to said second fan driving signal.

* * * * *